(12) United States Patent
Bankuty et al.

(10) Patent No.: US 6,279,722 B1
(45) Date of Patent: Aug. 28, 2001

(54) ROTARY ORIENTER DUAL INDEXING SYSTEM

(75) Inventors: Geza E. Bankuty, Holmes Beach; Nicholas J. Perazzo, Sarasota, both of FL (US)

(73) Assignee: New England Machinery, Inc., Bradenton, FL (US)

( * ) Notice: Subject to any disclaimer, the term of this patent is extended or adjusted under 35 U.S.C. 154(b) by 0 days.

(21) Appl. No.: 09/717,683

(22) Filed: Nov. 21, 2000

Related U.S. Application Data

(63) Continuation-in-part of application No. 09/502,262, filed on Feb. 11, 2000.

(51) Int. Cl.[7] .................................................. B65G 43/08
(52) U.S. Cl. .................................... 198/395; 198/377.1
(58) Field of Search ............................... 198/395, 377.1, 198/377.07

(56) References Cited

U.S. PATENT DOCUMENTS 4,428,474 * 1/1984 Gau et al. ............................ 198/394
4,993,537 * 2/1991 Bianchini et al. ................... 198/395

* cited by examiner

*Primary Examiner*—Christopher P. Ellis
*Assistant Examiner*—Joe Dillon, Jr.
(74) *Attorney, Agent, or Firm*—Pettis & Van Royen, PA

(57) ABSTRACT

A dual indexing system for rotary orienters for positioning articles so that a feature of each article is facing in the same predetermined direction. The invention comprises a turret having at least one station that is connected to the turret column and rotates therewith as the column rotates about its axis. The station comprises a spindle with a driven turntable attached to support the bottom of an article and a shaft with a driven platen attached to hold the top of the article, the spindle and the shaft being rotatable about their longitudinal axes, which are coincident. A lower indexing assembly and an upper indexing assembly initiate simultaneous rotation of their respective turntable and platen. Each indexing assembly comprises a slip clutch, an indexing wheel that has at least two detents formed therein, an arm that is engageable with the detents and an actuator that is engageable with the arm. When the arms engage their respective indexing wheel, the spindle and the shaft are prevented from rotating. When a sensor indicates an article is improperly oriented, the actuators engage their respective arms so that the arms are disengaged from the detents allowing simultaneous rotation of the turntable and platen. Rotation continues until the arms are released by the actuators and engage another one of the detents.

6 Claims, 13 Drawing Sheets

ROTARY ORIENTER DUAL INDEXING SYSTEM

RELATED APPLICATIONS

This application is a continuation-in-part of U.S. patent application Ser. No. 09/502,262, filed on Feb. 11, 2000.

BACKGROUND OF THE INVENTION

1. Field of the Invention

The present invention relates to indexing systems for rotary orienters. Rotary orienters position articles being conveyed on a conveyor system so that a feature of each article is facing in the same predetermined direction, for example, with a handle leading. The invention is directed to an improved apparatus for indexing the rotation of articles, rotating them rapidly but smoothly to a precise predetermined orientation about their vertical axis. The apparatus may be used in conjunction with filling, capping, labeling and inspection of containers, or other similar operations.

2. Description of the Prior Art

The packaging industry handles many different articles that must be packaged, filled, processed, or acted on in some manner. These articles are made in many different sizes and shapes that are not necessarily symmetrical. They may have a handle, an opening, or another feature that is off center, or they may have other identifiable characteristics. In the packaging industry, the articles may require that a label be applied to a particular side, or that a product be inserted through an opening in the article, or some other requirement that necessitates the articles being oriented in a uniform manner while being processed along a production line. The articles may be introduced to a linear conveyor system with these key features randomly oriented, for example the off-center opening into a container. It is then necessary to index the opening of the articles to be filled so that the opening of each article will be aligned with a filling spout. The indexing system is critical to ensure the selected feature of the articles are rotated to the same precise orientation, so the next apparatus in the production line may operate on each article with the same result. Light weight containers require stabilization during rotation to prevent them from falling over or being ejected from the container orienter. A gripper, platform or other apparatus is frequently used to engage the top of the container to prevent tipping. While the grippers and platforms rotate freely there is still a resistance in this apparatus. During high-speed rotation, this resistance causes a gripped container top to rotate more slowly than the container bottom while bringing the container bottom up to rotation speed, causing fragile light weight containers to twist and become permanently distorted. To avoid this problem, the gripper, platform or other apparatus must be driven at the precise start time and at the precise speed at which the support for the bottom of the container is rotating.

Apparatus for orienting articles that use various indexing methods, are well-known in the packaging industry. The patent to Schneemann, U.S. Pat. No. 4,606,244, illustrates a complex apparatus for incrementally rotating a turntable from one workstation to another. This apparatus is actuated by a linearly translating driver. The primary purpose of the apparatus is to firmly lock the turntable with a locking pawl at each workstation The apparatus does not permit selective rotation and is overly complex for use in orienting articles.

U.S. Pat. No. 3,934,714, issued to Takao Matsumoto, uses a friction wheel attached to the rotatable table that selectively engages a centrally driven friction wheel for rotation of the table. A detection device issues a signal to the indexing system to initiate rotation. A terminating signal frees the friction wheel of the rotatable table from the central friction wheel. An electromagnetic brake is used to stop the rotation of the rotatable table in response to the terminating signal. The use of friction wheels and electromagnetic brakes provide a system that is imprecise.

U.S. Pat. No. 3,957,154 discloses yet another method for rotation of containers, however this rotation is for inspection or labeling purposes of round containers and precise positioning is unnecessary.

Notwithstanding the existence of such prior art indexing systems, it remains clear that there is a need for a rotary orienter having an indexing system that will permit smooth and precise rotation of a fragile article. The apparatus gripping the top of the container and the apparatus gripping the bottom of the container must both be driven simultaneously to rotate the container to a predetermined position to enable further production steps to be precisely undertaken.

SUMMARY OF THE INVENTION

The present invention relates to a rotary orienter having a dual indexing system that smoothly and accurately rotates the tops and bottoms of articles to a predetermined orientation so that further operations may be accurately performed on the articles. The rotary orienter receives randomly oriented articles from a standard linear conveyor system through an entrance star wheel that places the articles on at least one station that is rotated about a central axis of a turret assembly. Improperly oriented articles are rotated by the station about the station's axis, to a uniform predetermined orientation. The articles then depart the rotary orienter through an exit star wheel that places the articles on an exit linear conveyor system.

Most simply stated, the invention comprises a support frame to which is mounted a central column that is rotatable about its axis by a rotating means. There is at least one station that is connected to the column and rotates with the column as the column rotates about its axis.

The station comprises a spindle that is rotatably connected to the column, the spindle having a first end and a second end. The spindle is rotatable about its longitudinal axis by a means for rotating the spindle. A turntable is attached to the first end of the spindle. The means for rotating the spindle is connected to the spindle proximal the second end of the spindle and it is also connected to the support frame. A lower indexing assembly is attached to the spindle and to the support frame of the rotary orienter.

The lower indexing assembly comprises a lower slip clutch that is mounted on the spindle proximal the means for rotating the spindle. A lower indexing wheel, that has at least two detents formed therein, is mounted on the spindle intermediate the turntable and the slip clutch. The first end of a lower arm is pivotally mounted to the support frame so that the second end extends outwardly in relation to the column. The lower arm is engageable with the detents of the lower indexing wheel so that when the lower arm is so engaged the indexing wheel and the spindle are prevented from rotating, even when the means for rotating the spindle is operating. A lower actuator is connected to the support frame so that it is engageable with the lower arm. When the lower actuator engages the lower arm, the lower arm is disengaged from one of the detents, thereby allowing the turntable to rotate until the lower arm is released by the lower actuator and the lower arm engages the other one of the detents.

The station further comprises a shaft that is rotatably connected to the column, the shaft having a first end and a second end. The shaft is rotatable about its longitudinal axis by a means for rotating the shaft. The longitudinal axis of the shaft is generally coincident with the longitudinal axis of the spindle. A platen is attached to the first end of the shaft. The means for rotating the shaft is connected to the shaft a a in and in in in an and a in and in in an in and in in in and in and in and in an and in in and and nd it is also connected to the support frame. A means for moving the platen between a first position and a second position is attached to the second end of the shaft and is connected to the support frame. An upper indexing assembly is attached to the shaft and to the support frame of the rotary orienter.

The upper indexing assembly comprises an upper slip clutch that is mounted on the shaft. An upper indexing wheel, that has at least two detents formed therein, is mounted on the shaft intermediate the platen and the upper slip clutch. The first end of an upper arm is pivotally mounted to the support frame so that the second end extends outwardly in relation to the column. The upper arm is engageable with the detents of the upper indexing wheel so that when the upper arm is so engaged the upper indexing wheel and the shaft are prevented from rotating, even when the means for rotating the shaft is operating. An upper actuator is connected to the support frame so that it is engageable with the upper arm. When the upper actuator engages the upper arm, the upper arm disengages from one of the detents, thereby allowing the platen to rotate until the upper arm is released by the upper actuator and the upper arm engages the other one of the detents.

The rotary orienter further comprises a means for moving articles onto the turntable in generally random orientation. At least one sensor is mounted to the support frame for determining the orientation of the article that has been placed upon the turntable. When orientation of an article is not in accordance with the predetermined orientation, the sensor simultaneously signals and thereby activates the lower and upper actuators for synchronized rotation of the turntable and the platen.

The invention accordingly comprises an article of manufacturer possessing the features, properties, and the relation to elements which will be exemplified in the article hereinafter described, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings, in which.

Similar reference characters refer to similar parts throughout the several views of the drawings.

DESCRIPTION OF A PREFERRED EMBODIMENT

Figure 1:
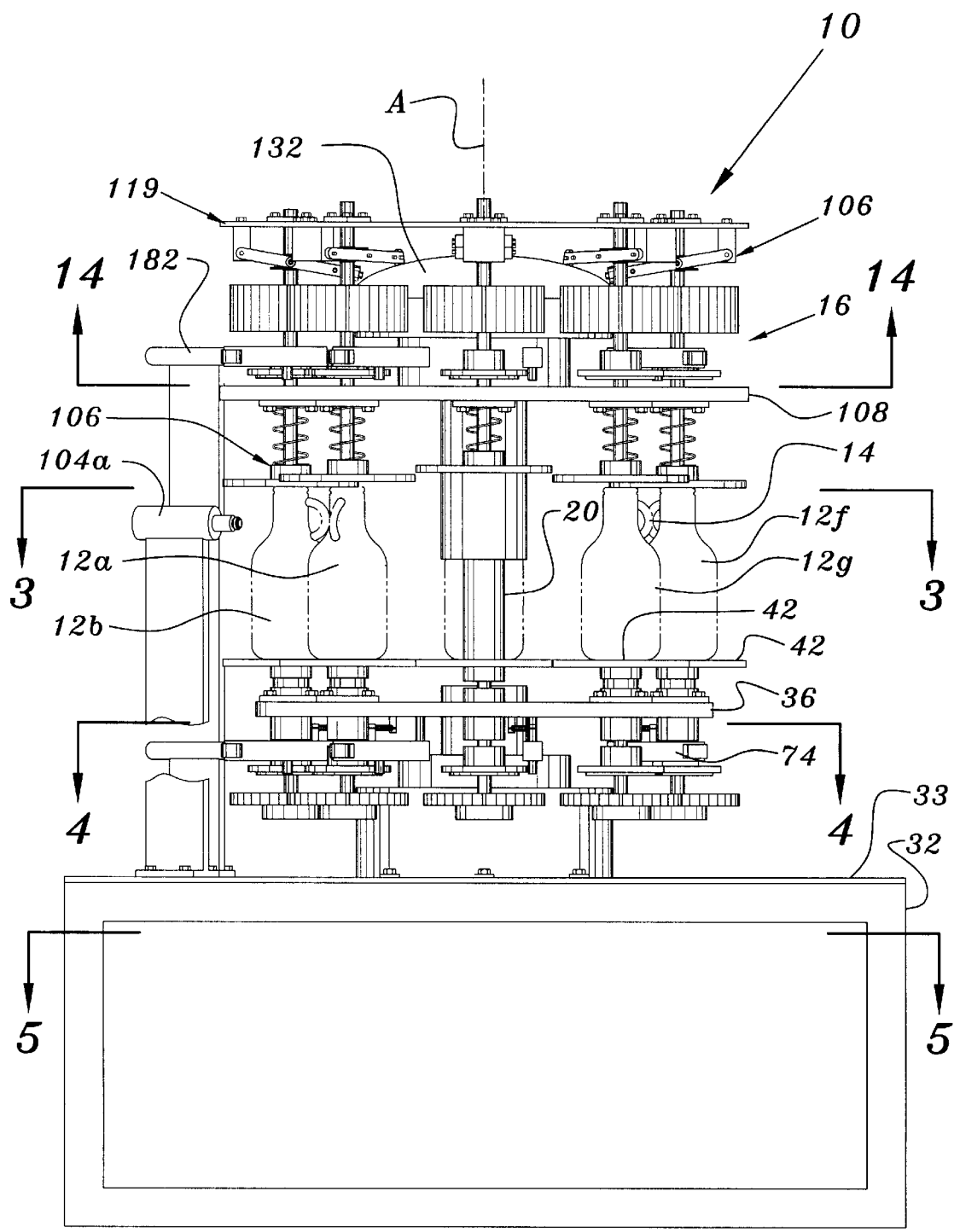
FIG. 1 is a front elevational view of the rotary orienter of this invention.

A preferred embodiment of the rotary orienter of this invention is illustrated in the drawing FIGS. 1–17. The rotary orienter is indicated generally as 10 in FIGS. 1 and 2 and the objects upon which the rotary orienter will act, are indicated as 12 in FIGS. 1, 2, and 3. For ease of illustration, the objects shown are four sided containers 12 having an open handle 14 that projects from the neck of the container generally perpendicular to one of the sides of the container 12. With proper adjustment, the rotary orienter 10 will operate upon many different objects having different shapes, including containers having a circular or oval cross-section and those having a plurality of sides, including but not limited to, triangular, square and rectangular.

Figure 2:
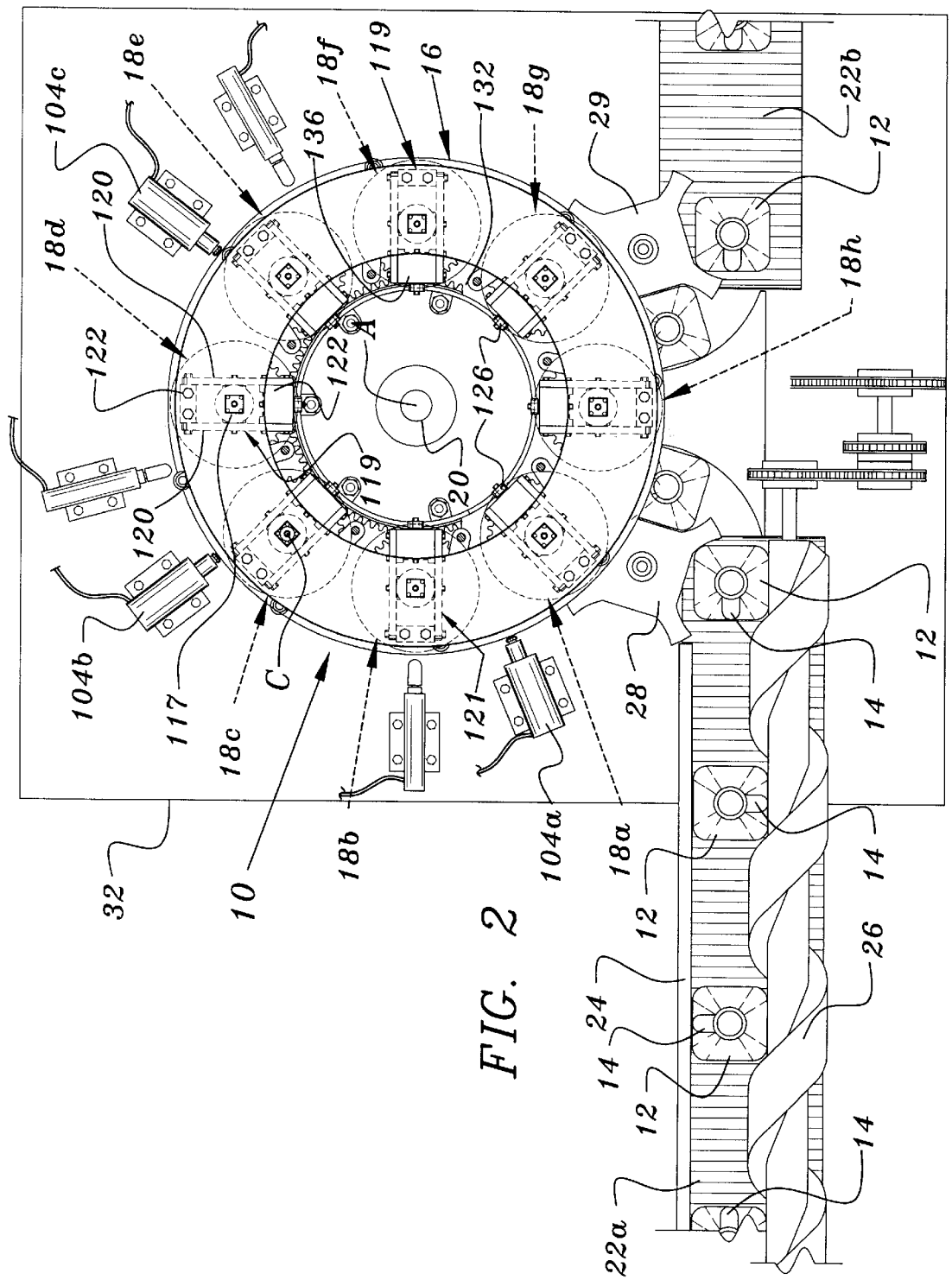
FIG. 2 is a top plan view of the invention of FIG. 1 further illustrating the conveyor system.
Figure 3:
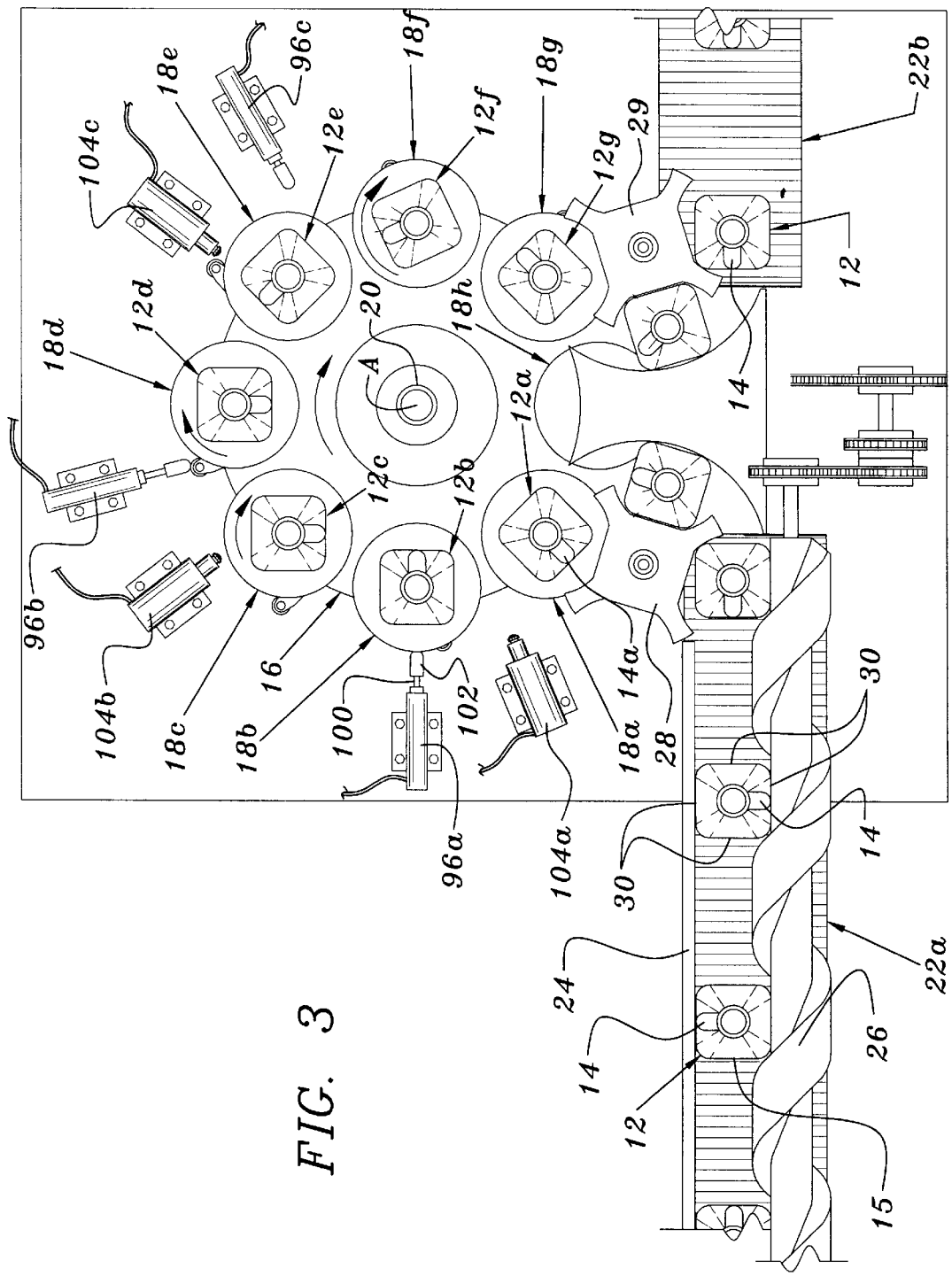
FIG. 3 is a cross-sectional plan view taken along line 3—3 of FIG. 1, including the conveyor system.

As can be seen in FIG. 1, and more clearly in FIG. 2 and FIG. 3, the turret assembly 16 of the rotary orienter 10, of this illustrated embodiment, has eight stations 18a–h configured about a central column 20. In other embodiments, there may be as many or as few stations as is suitable for the purpose of the rotary orienter 10. As seen in FIG. 2 and more clearly in FIG. 3, a linear entrance conveyor 22a receives containers 12 in random orientation, with the handle 14 being, in this example, the primary indicator of improper orientation. In other examples, it may be the location of the opening into the container 12, it may be labels attached to the containers 12, or it may be a specific shape that is formed in the containers 12 that identifies a particular orientation. A guide 24 keeps the containers on the entrance conveyor 22a as a screw feeder 26 spaces the containers 12 from each other and advances the containers 12 to an entrance star wheel 28. In this preferred embodiment, the containers 12 have generally equal sides 30, so that the containers may be oriented by the conveyor system 22 in any one of four positions. Three of these positions will be incorrect and one will be correct In other embodiments, the containers may be rectangular with two long sides and two short sides so that the conveyor system 22 will orient the containers in either of two positions, one of which is correct and the other one is not. In an embodiment processing triangular containers, the conveyor system 22 will position one of the container's sides away from the screw feeder, which will be constructed to receive a triangular shape. A triangular container will have two incorrect positions and one correct position.

To properly orient the containers in these various embodiments, the rotary orienter 10 must rotate the containers through the appropriate number of degrees. For example to orient a rectangular container will only require a single rotation of 180 degrees if the container is oriented incorrectly. A triangular container will be rotated in 120 degree increments until the container is determined to be correctly positioned. A square container will be rotated in 90 degree increments until the container is determined to be correctly positioned.

Figure 6:
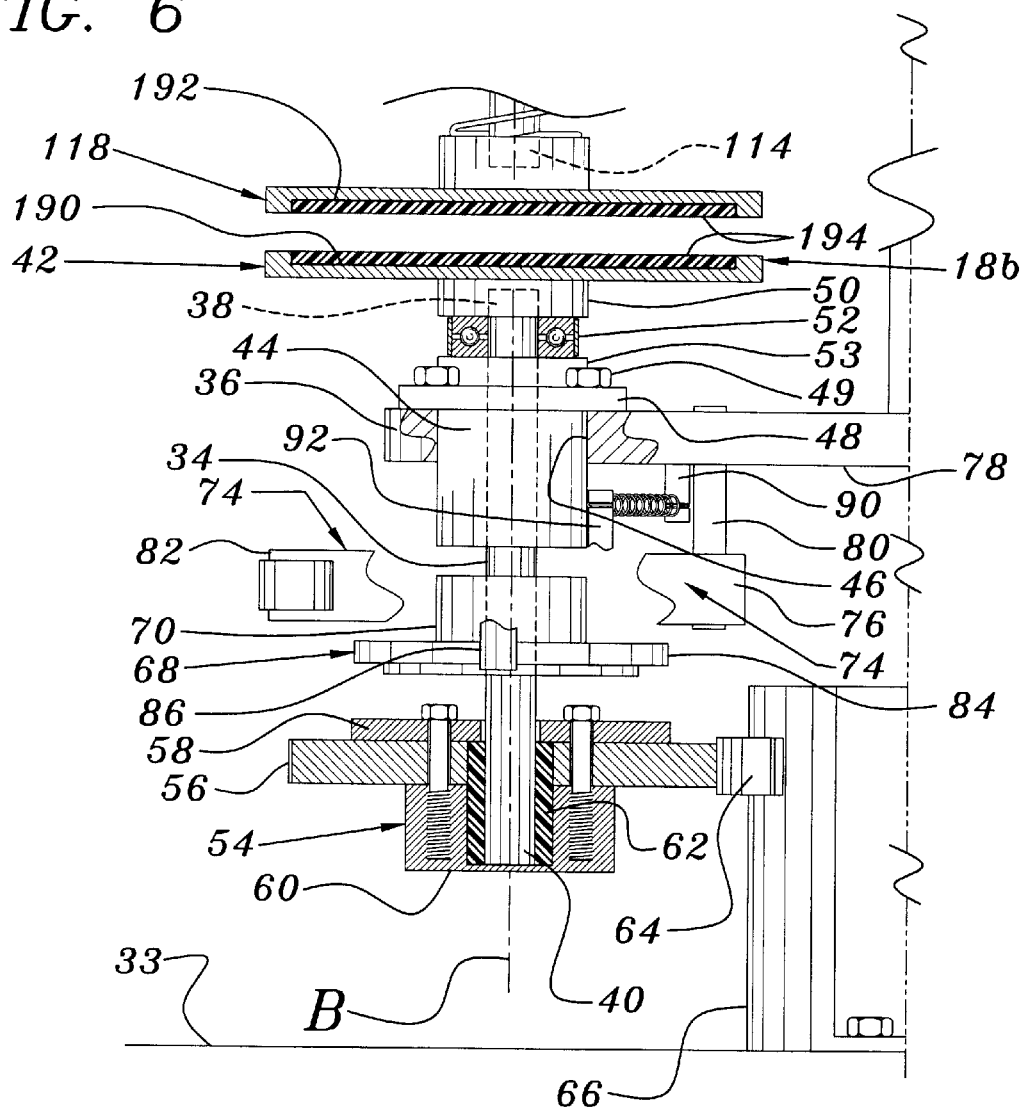
FIG. 6 is a detailed elevational view of one station of the rotary orienter of FIG. 1, showing the upper portion of the station broken away for convenience.

The rotary orienter 10, in the preferred embodiment illustrated, is capable of rotating a container 12 through three 90 degree increments, for a total of 270 degrees of rotation. As seen in FIG. 3 the illustrated embodiment of the turret assembly 16 comprises eight stations 18a–h. As shown in FIG. 1, the turret assembly 16 is mounted to a support frame 32 that includes a horizontal surface 33. The support frame 32 is generally constructed from steel to support the weight of the turret assembly 16. The central column 20 is bolted or welded to the horizontal surface 33. As shown in FIG. 6, each station 18a–h comprises a spindle 34, which has a longitudinal axis B. The spindle 34 is connected to the central column 20 for rotation of each station about the central column's longitudinal axis A. Each spindle 34 is mounted to and extends through a lower plate 36 so that the spindle 34 may be rotated about its longitudinal axis B by a spindle rotating means. For convenience the lower plate 36 is circular and the spindles are mounted equidistant from the longitudinal axis A for proper interaction with the entrance star wheel 28 and the exit star wheel 29. The lower plate 36 is mounted to the central column 20 by welding or by other well-known means. For example, in other embodiments, the lower plate 36 may be welded to a sleeve (not shown) that is keyed or bolted to the central column 20. Each spindle 34 has a first end 38 and a second end 40.

Each station 18a–h further comprises a turntable 42 that is attached to the first end 38 of the spindle 34 by a set screw, bolting, welding or by other well-known means. The spindle 34 is mounted to the lower plate 36 by a radial bearing 44, which is used to stabilize the spindle 34 and permit it to rotate freely within the radial bearing 44. The radial bearing 44 is mounted through a hole 46 in the lower plate 36 and the flange 48 of the radial bearing 44 is bolted by bolts 49 to the lower plate 36. The hub 50 of the turntable 42 rests upon a thrust bearing 52 that is attached to a spacing collar 53 and the flange 48 of the radial bearing 44 for free rotation of the upper portion of the radial bearing 44 along with the turntable 42. The spacing collar 53 is simply used to adjust the final height of the turntable 42 to ensure it is level with the entrance and exit star wheels 28 and 29 respectively. In other embodiments, the spacing collar 53 may not be necessary and the bottom of the thrust bearing will be bolted directly to the radial bearing flange 48.

Figure 4:
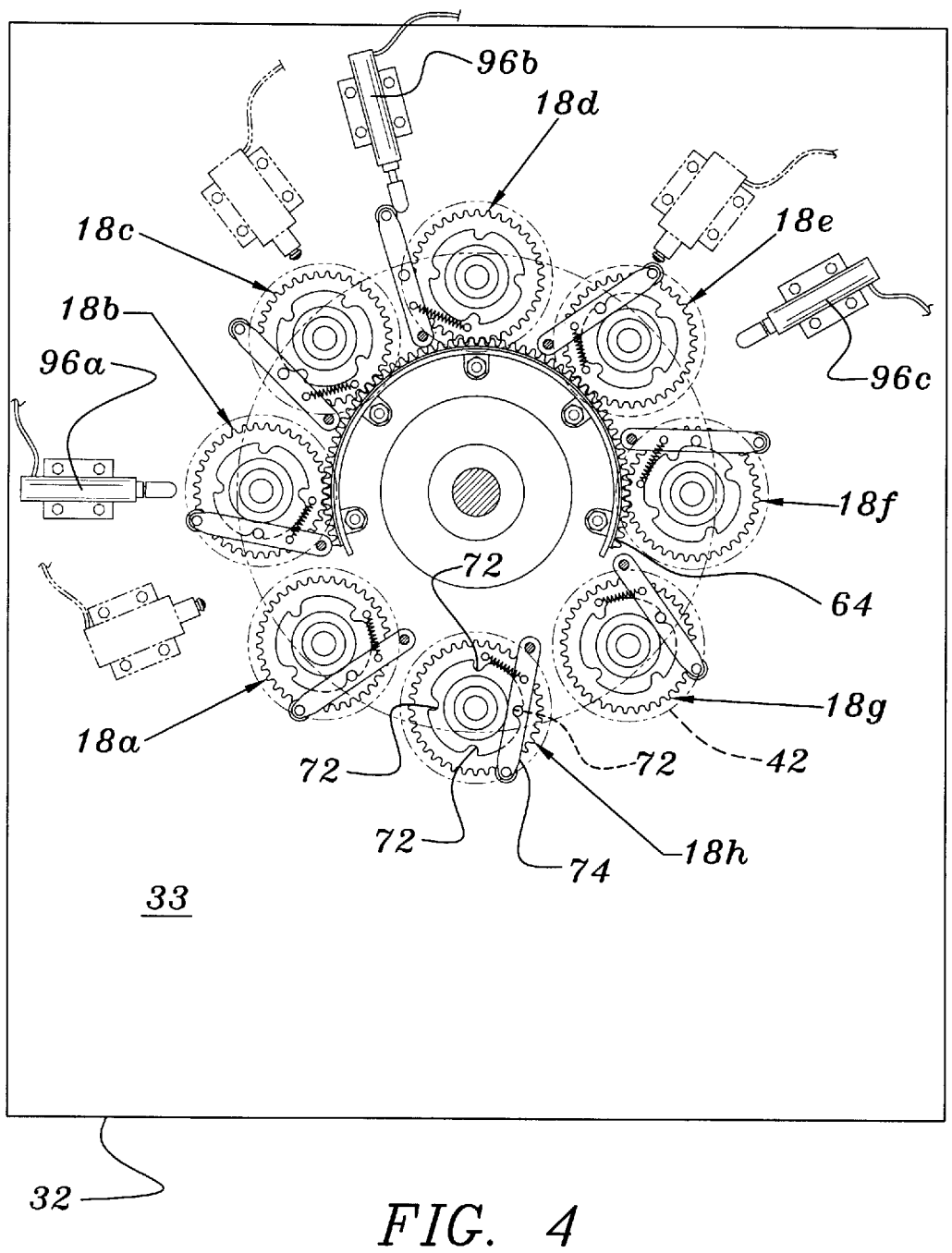
FIG. 4 is a cross-sectional plan view taken along line 4—4 of FIG. 1.

A means for rotating the spindle 34 is connected to the support frame 32 and to the spindle 34. In this embodiment, the means for rotating the spindle 34 comprises a lower slip clutch 54, that is mounted proximal to the second end 40 of the spindle 34, and a lower gear 56, that is mounted to the lower slip clutch so that when the spindle 34 is prevented from rotating, the lower gear 56 may continue to rotate once it overcomes the resistance of the lower slip clutch 54. The lower gear 56 is bolted between a lower gear hub 58 and the outer portion 60 of the lower slip clutch 54. The second end 40 of the spindle 34 is attached to the inner portion 62 of the lower slip clutch 54. The lower slip clutch should be set for between 5 and 10 inch-pounds of torque for the majority of applications of the rotary orienter 10. The lower slip clutch 54 may be any well-known slip clutch that is suitable for the purpose, for example a model No. L4-1-312A Hilliard slip clutch would be suitable in most cases. The lower gear 56 is preferably made from nylon, but may be made from suitable plastics or metals. The means for rotating the spindle 34 further comprises gear teeth, conveniently a lower flexi-rack 64, that are mounted to a support member 66, which is bolted to the horizontal surface 33 of the support frame 32. The lower flexi-rack 64 is positioned so that the teeth of the lower gear 56 will engage the teeth of the lower flexi-rack 64 as the station 18 rotates about the central column 20. The teeth of lower gear 56 and the teeth of the lower flexi-rack 64 must be comparable (have the same pitch and preferably the same size for proper engagement of the teeth of the lower gear 56 with the teeth of the lower flexi-rack 64). As seen in FIG. 4, the lower flexi-rack 64 extends only for a portion of the circumference about the central column 20. The length of the lower flexi-rack 64 need be only as long as required by the maximum number of rotations needed to orient the article 12. For example, if the article has only two possible orientations only one rotation of 180 degrees will be required and only a short length of lower flexi-rack 64 will be needed. In the example illustrated in FIG. 4, there are four possible orientations and up to three rotations of 90 degrees each, requiring a longer segment of lower flexi-rack 64. As long as the lower gear 56 engages the lower flexi-rack 64, the lower gear 56 will rotate the spindle 34, if the spindle 34 is free to rotate. This is an efficient and dependable method for rotating the spindle 34, but it is just one means that is available. Those skilled in the art may fashion other methods, for example using timing belts and planetary gears. The lower flexi-rack 64 may be positioned on the outer perimeter of the rotary orienter 10; however, placement in the interior position, as disclosed in FIG. 4 and FIG. 6, results in greater accuracy and a smoother operation. The lower flexi-rack is preferably made from acetal plastic.

A lower indexing wheel 68 is mounted to the spindle 34 intermediate the lower gear 56 and the radial bearing 44. The lower indexing wheel 68 is attached, by bolting or other suitable means, to a lower indexing hub 70 that is attached to the spindle 34 by bolting, or a set screw, or other suitable means. The lower indexing wheel 68 has at least two detents 72 formed in the outer periphery of the lower indexing wheel. The number of detents 72 correlate with the number of possible orientations of the container. For example, a rectangular container having two possible orientations will require 2 detents 72 formed at 180 degree intervals, so that the turntable 42 rotates in 180 degree segments. A generally square container having four possible orientations (as illustrated in FIG. 4) has 4 detents 72 formed at 90 degree intervals so that the turntable 42 rotates in 90 degree segments. The lower indexing wheel 68 is preferably made from polyurethane to reduce noise created by operation of the rotary orienter 10.

A lower arm 74, has a first end 76 that is pivotally mounted to the bottom surface 78 of the lower plate 36 by a post 80. The second end 82 of the lower arm 74 extends outwardly, in relation to the central column 20, so that the lower arm 74 may engage the peripheral edge 84 of the lower indexing wheel 68 and the lower indexing wheel detents 72. When the lower arm 74 engages a detent 72 the lower indexing wheel 68 is prevented from rotating, which prevents the spindle 34 and the attached turntable 42 from rotating. In this embodiment the lower arm 74 further comprises a projection 86 that extends therefrom, so that when the lower arm 74 is aligned proximal to the peripheral edge 84 of the lower indexing wheel 68, the projection 86 is engageable with the peripheral edge of the lower indexing wheel 68 and the detents 72 formed therein. As best seen in FIGS. 8–13, the lower arm 74 is biased toward the lower indexing wheel 68 by a spring 88 that has one end attached to a first peg 90, that is attached to the bottom surface 78 of lower plate 36, and a second peg 92 that is attached to the lower arm 74. A wheel 94 may be rotatably attached to the second end 82 of the lower arm 74 so that it extends outwardly therefrom.

As seen in FIG. 4 and FIG. 8–13 a lower actuator 96 is connected to the horizontal surface 33 of the support frame 32 for engagement with the lower arm 74. The lower actuator 96 selectively engages the lower arm 74 so that the lower arm 74 disengages from the detent 72 allowing the lower indexing wheel 68 to rotate. As soon as the lower actuator 96 releases the lower arm 74 from engagement with a detent and the lower indexing wheel 68 rotates, the lower actuator releases the lower arm 74 so that the lower arm 74 engages the peripheral edge 84 of the lower indexing wheel 68. As the lower indexing wheel 68 continues to rotate the lower arm 74 engages the next detent 72 locking the lower indexing wheel to prevent rotation. In this embodiment, the lower actuator 96 comprises a first single acting pneumatic or hydraulic cylinder 98 having a piston 100 that extends outwardly when the first pneumatic cylinder 98 is activated. The lower actuator 96 is so aligned that upon activation of the first pneumatic cylinder 98, the first end 102 of the piston 100 is extended outwardly and engages the second end 82 of the lower arm 74. As the station 18 rotates about the central column 20 the lower arm 74 is held by the lower actuator 96 until the lower arm 74 releases the lower indexing wheel 68. For smooth operation, the first end 102 of the piston 100 engages the wheel 94 that is attached to the second end 82 of the lower arm 74.

Figure 7:
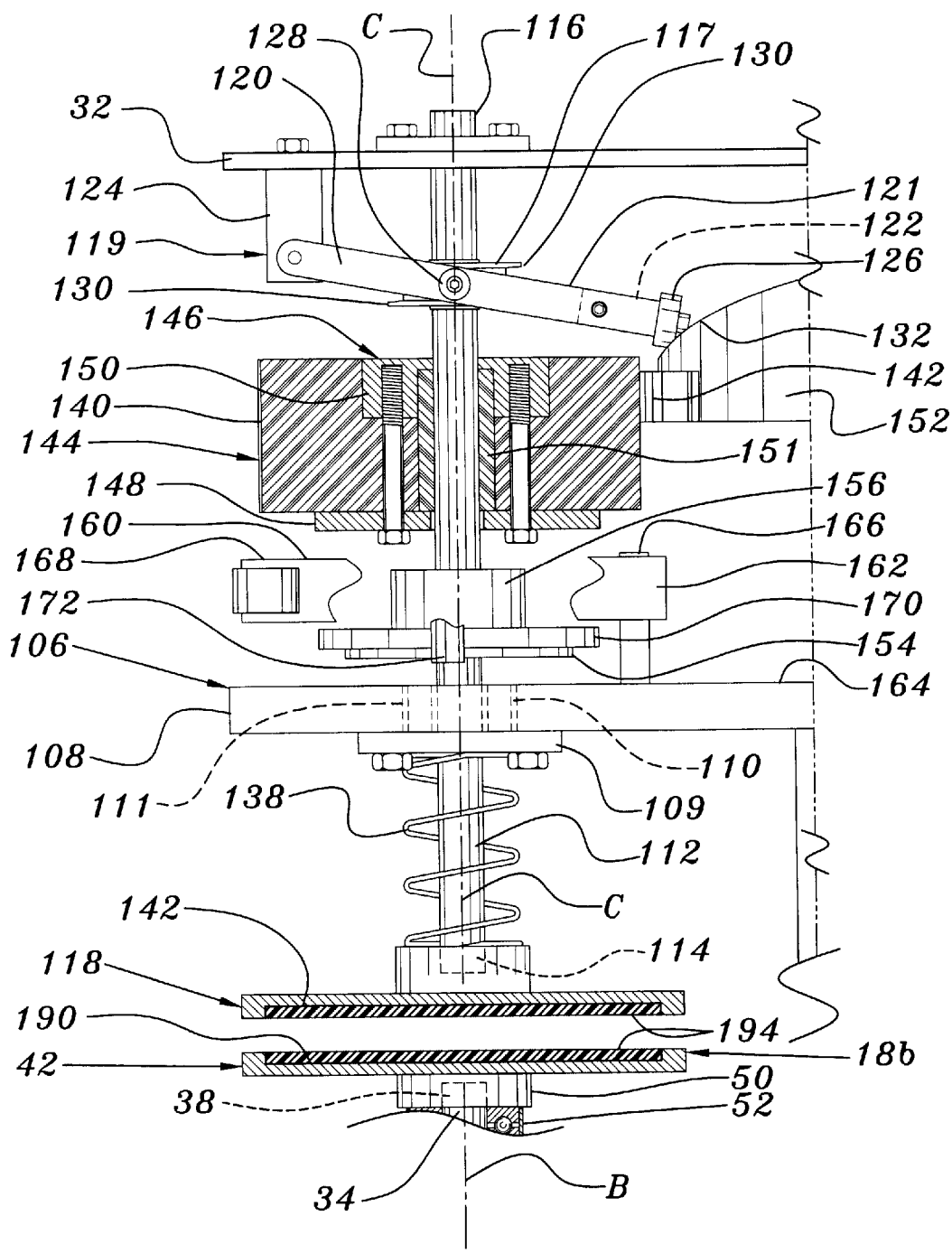
FIG. 7 is a detailed elevational view of one station of the rotary orienter of FIG. 1, showing the lower portion of the station broken away for convenience.

Stabilization of the article or container being oriented is often necessary. When an article is heavy enough, it will maintain its position on the turntable 42 during orientation without additional support. As shown in FIG. 1 and FIG. 7, if the article is light and easily tipped over, at least one means for stabilizing 106 the articles 12 is necessary. As seen in FIG. 1, a stabilizing means 106 is provided in conjunction with each station, so that the stabilizing means 106 overlies each turntable 42. In some embodiments, the stabilizing means is not driven and rotates with the article as it rotates. However, with articles made from very light weight materials, the resistance to rotation provided by the stabilizing means 106 is enough to cause the articles to fail through twisting. Therefore, in a preferred embodiment, the stabilizing means 106 is driven to match the rotation of the turntable 42. The stabilizing means 106 operates much in the same way as the means for supporting the objects 12 on the turntables 42 and has much of the same structure.

As seen most clearly in FIG. 1 and FIG. 7, the stabilizing means 106 comprises an upper plate 108, which may be constructed from any suitable shape, but in a preferred embodiment is circular, which is mounted to the central column 20 for rotation therewith. The upper plate 108 is spaced apart from lower plate 36. A radial bearing 110 projects downwardly through a hole 111 in the upper plate 108 and its flange 109 is bolted to the upper plate 108. A shaft 112 having a first end 114 and a second end 116 extends through the radial bearing 110 so that its extended longitudinal axis C is generally coincident with the longitudinal axis B of the spindle 34. The first end 114 is attached to a platen 118 that is sized and configured so that it overlies the turntable 42. It is not necessary that the platen 118 have the same diameter as the turntable 42; however, it must be large enough to grip the top of the article, conveniently container 12. A means for moving 119 the platen 118, moves the platen 118 between a first position, where the platen 118 is fully raised, and a second position, where the platen 118 is fully lowered. The means for moving 119 the platen 118 is best seen in FIG. 2 and FIG. 7. It comprises a spool 117 mounted proximal the second end 116 of the shaft 112. A lever, conveniently rectangular frame 121, comprising a pair of arms 120 and a pair of cross members 122, is pivotally attached by one of its cross members 122 to a vertical element 124 that is attached to the support frame 32. To the outer side of the other cross member 122 is attached a cam follower 126. On the interior of each arm 120 is attached a rotatable wheel 128 which is captured between the rims 130 of the spool 117. A cam 132 is mounted concentrically about axis A of the central column 20. The cam 132 is used to move the platen 118 to the first position to permit containers to be placed upon or removed from the turntable 42. Thus, the portion of the cam 132 that raises the shaft 112 comprises a small segment of a circle, so the cam 132 may extend a full 360 degrees with a small raised portion or the cam 132 may be a smaller segment of a circle. A spring 138 is mounted on the shaft 112 between the radial bearing 110 and the platen 118 so that the platen is biased toward the container gripping position.

A means for rotating the shaft 112 is connected to the support frame 32 and to the shaft 112. The means for rotating the shaft 112 is very similar to the means for rotating the spindle 34. The main difference is that the upper gear 140 has a greater thickness to maintain contact with the second set of gear teeth, conveniently second flexi-rack 142 as the platen 118 is moved between the first and second positions. The means for rotating the shaft 144 comprises an upper slip clutch 146, that is mounted on the shaft 112 and to the upper gear 140, so that when the shaft 112 is prevented from rotating, the upper gear 140 may continue to rotate once it overcomes the resistance of the upper slip clutch 146. The upper gear 140 is bolted between an upper gear hub 148 and the outer portion 150 of the upper slip clutch 146. The second end 116 of the shaft 112 is attached to the inner portion 151 of the upper slip clutch 146 by keying, pining or any other suitable well known means. The upper slip clutch should be set for between 5 and 10 inch-pounds of torque for the majority of applications of the rotary orienter 10. The upper slip clutch 146 may be any well-known slip clutch that is suitable for the purpose, for example a model No. L4-1-3 12A Hilliard slip clutch would be suitable in most cases. The upper gear 140 is preferably made from nylon, but may be made from suitable plastics or metals. The means for rotating 144 the shaft 112 further comprises gear teeth, conveniently an upper flexi-rack 142, that are mounted to a support member 152, which is bolted to the support frame 32. The upper flexi-rack 142 is positioned so that the teeth of the upper gear 140 will engage the teeth of the upper flexi-rack 142 as the station 18 rotates about the central column 20. The teeth of upper gear 140 and the teeth of the upper flexi-rack 142 must be comparable (have the same pitch and preferably the same size for proper engagement of the teeth of the upper gear 140 with the teeth of the upper flexi-rack 142). As seen in FIG. 2, the upper flexi-rack 142 extends only for a portion of the circumference about the central column 20. The length of the upper flexi-rack 142 need be only as long as required by the maximum number of rotations needed to orient the article 12, that is, only as long as the lower flexi-rack 64. As long as the upper gear 140 engages the upper flexi-rack 142, the upper gear 140 will rotate the shaft 112, if the shaft 112 is free to rotate. This is an efficient and dependable method for rotating the shaft 112, but it is just one means that is available. Those skilled in the art may fashion other methods, for example using timing belts and planetary gears. The upper flexi-rack 142 may be positioned on the outer perimeter of the rotary orienter 10; however placement in the interior position, as disclosed in FIG. 2 and FIG. 7 results in greater accuracy and a smoother operation. The upper flexi-rack 142 is preferably made from acetal plastic.

An upper indexing wheel 154 is mounted to the shaft 112 intermediate the upper gear 140 and the platen 118. The upper indexing wheel 154 is attached, by bolting or other suitable means, to an upper indexing hub 156 that is attached to the shaft 112 by bolting, or a set screw, or other suitable means. The upper indexing wheel 154 has at least two detents 158 formed in the peripheral edge 170 of the upper indexing wheel 154. The number of detents 158 correlates with the number of possible orientations of the container, therefore, the number detents 158 formed in the upper indexing wheel 154 matches the number detents 72 in the lower indexing wheel 68. As discussed previously, a rectangular container having two possible orientations will require two detents 158 formed at 180 degree intervals, so that the platen 118 rotates in 180 degree segments. A generally square container having four possible orientations (as illustrated in FIG. 4) has 4 detents 158 formed at 90 degree intervals so that the platen 118 rotates in 90 degree segments. The upper indexing wheel 154 is preferably made from polyurethane to reduce noise created by operation of the rotary orienter 10.

Figure 15:
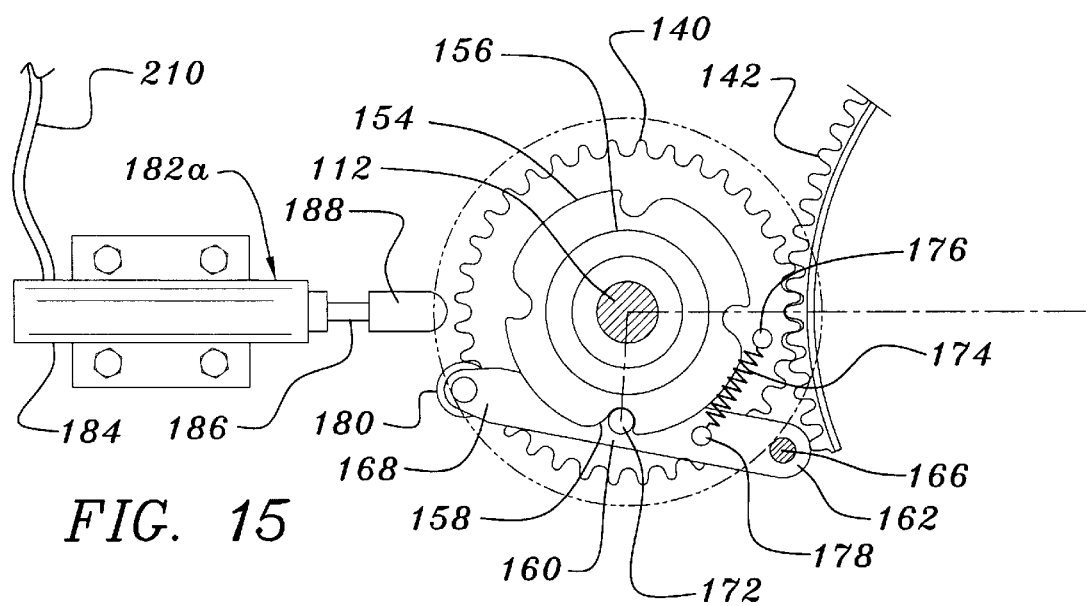
FIG. 15 is a detailed plan view of the upper indexing assembly of the invention of FIG. 1 illustrating the extension of the upper actuator.
Figure 16:
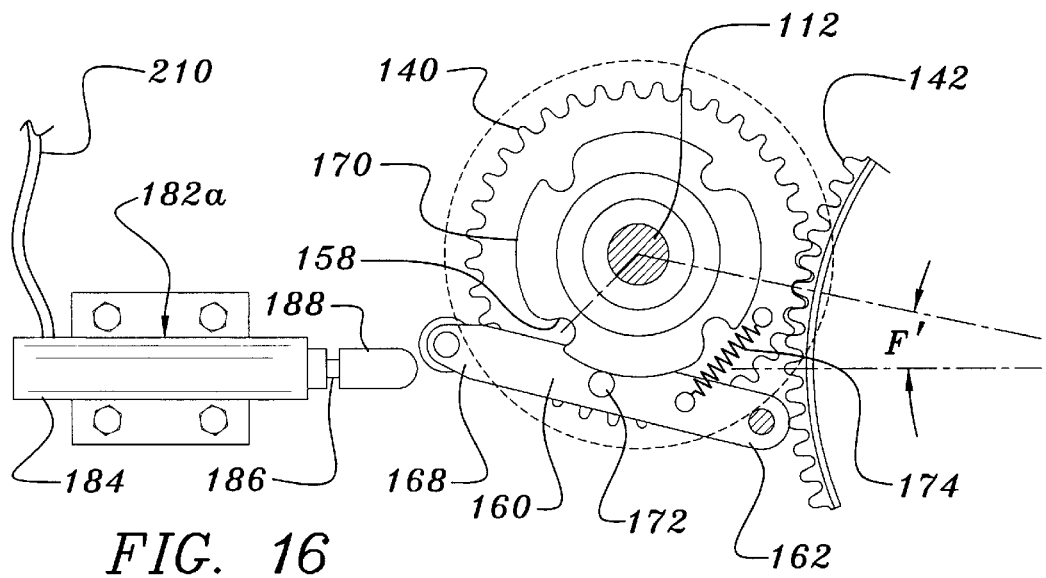
FIG. 16 is a detailed plan view of the upper indexing assembly of FIG. 15, illustrating rotation of the rotary orienter turret and retraction of the upper actuator.
Figure 17:
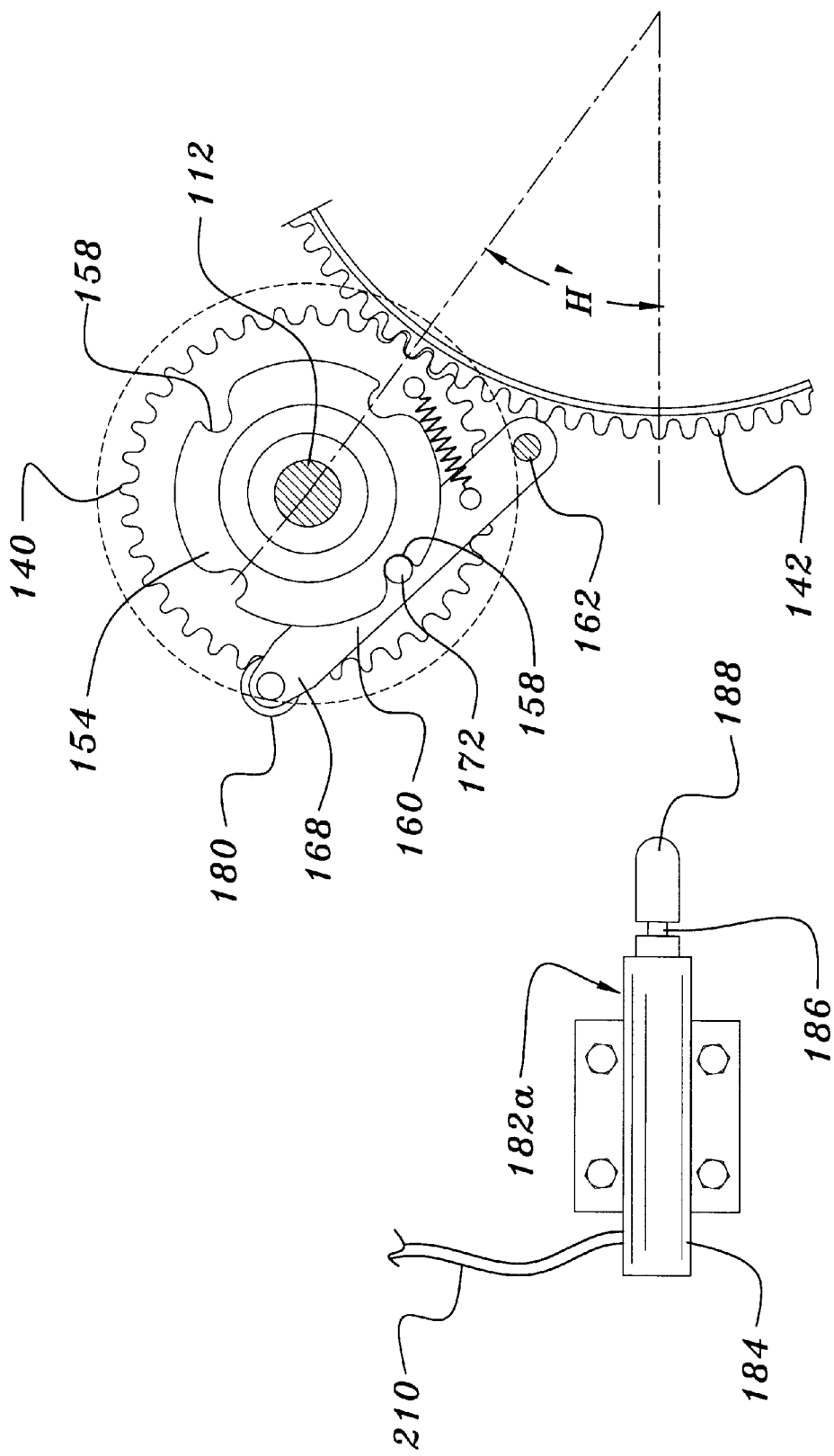
FIG. 17 is a detailed plan view of the upper indexing assembly of FIG. 16, illustrating further rotation of the rotary orienter turret and re-engagement of the upper arm with a detent of the upper indexing wheel.

An upper arm 160, has a first end 162 that is pivotally mounted to the top surface 164 of the upper plate 106 by a post 166. The second end 168 of the upper arm 160 extends outwardly, in relation to the central column 20, so that the upper arm 160 may engage the peripheral edge 170 of the upper indexing wheel 154 and the upper indexing wheel detents 158. When the upper arm 160 engages a detent 158 the upper indexing wheel 154 is prevented from rotating, which prevents the shaft 112 and the attached platen 118 from rotating. In this embodiment, the upper arm 160 further comprises a projection 172 that extends therefrom, so that when the upper arm 160 is aligned proximal to the peripheral edge 170 of the upper indexing wheel 154, the projection 172 is engageable with the peripheral edge 170 of the upper indexing wheel 154 and the detents 158 formed therein. As best seen in FIGS. 15–17, the upper arm 160 is biased toward the upper indexing wheel 154 by a spring 174 that has one end attached to a first peg 176, that is attached to the top surface 164 of the upper plate 108, and a second peg 178 that is attached to the upper arm 160. A wheel 180 may be rotatably attached to the second end 168 of the upper arm 160 so that it extends outwardly therefrom.

As seen in FIG. 1, FIG. 14 and FIGS. 15–17 an upper actuator 182 is connected to the horizontal surface 33 of the support frame 32 for engagement with the wheel 180 on the second end 168 of the upper arm 160. The upper actuator 182 selectively engages the upper arm 160 so that the upper arm 160 disengages from the detent 158 allowing the upper indexing wheel 154 to rotate. As soon as the upper actuator 182 releases the upper arm 160 from engagement with a detent and the upper indexing wheel 154 rotates, the upper actuator 182 releases the upper arm 160 so that the upper arm 160 engages the peripheral edge 170 of the upper indexing wheel 154. As the upper indexing wheel 154 continues to rotate the upper arm 160 engages the next detent 158 locking the upper indexing wheel to prevent rotation. In this embodiment, the upper actuator 182 comprises a second single acting pneumatic or hydraulic cylinder 184 having a piston 186 with a first end 188, that extends outwardly when the second pneumatic cylinder 184 is activated. The upper actuator 182 is so aligned that upon activation of the second pneumatic cylinder 184, the first end 188 of the piston 186 is extended outwardly and engages the second end 168 of the upper arm 160. As the station 18 rotates about central column 20 the upper arm 160 is held by the upper actuator 182 until the upper arm 160 releases the upper indexing wheel 154. For smooth operation, the first end 188 of piston 186 engages the wheel 180 that is attached to the second end 168 of the upper arm 160.

At least one sensor 104, in a preferred embodiment as shown in the drawings, sensors 104a–c, is mounted to the support frame 34 for determining the orientation of an article, when the article is placed on a turntable 18a–h. The sensor 104a is electrically connected to the lower actuator 96a and the upper actuator 182a for activation of the corresponding first and second pneumatic cylinders 98 and 184 and the pistons therein. If the sensor 104a determines that the orientation of container is incorrect, the sensor activates the lower actuator in order to release the turntable for rotation and activates the upper actuator to release the platen for rotation. The sensor 104a–c may be of any well-known type, including but not limited to, photoelectric, laser, bar-code readers, and vision systems that use cameras to measure differences in light and dark patterns or "smart cams" that measure and compare the pixels with a standard. Those skilled in the art will be able to determine the best sensor to use in relation to the particular article or container being oriented, and the circuitry for connecting the sensors 104a–c to the lower actuators 96a–c and upper actuators 182a–c respectively.

For stabilizing purposes a portion of the top surface 190 of the turntable 42 and the bottom surface 192 of the platen 118 include a nonslip surface 194 of polyurethane or silicon rubber. The surface may be painted on, glued on or poured in a fluid state into a cavity formed in the turntable 42 and the platen 118 as shown in FIGS. 6 and 7, where it hardens.

Figure 5:
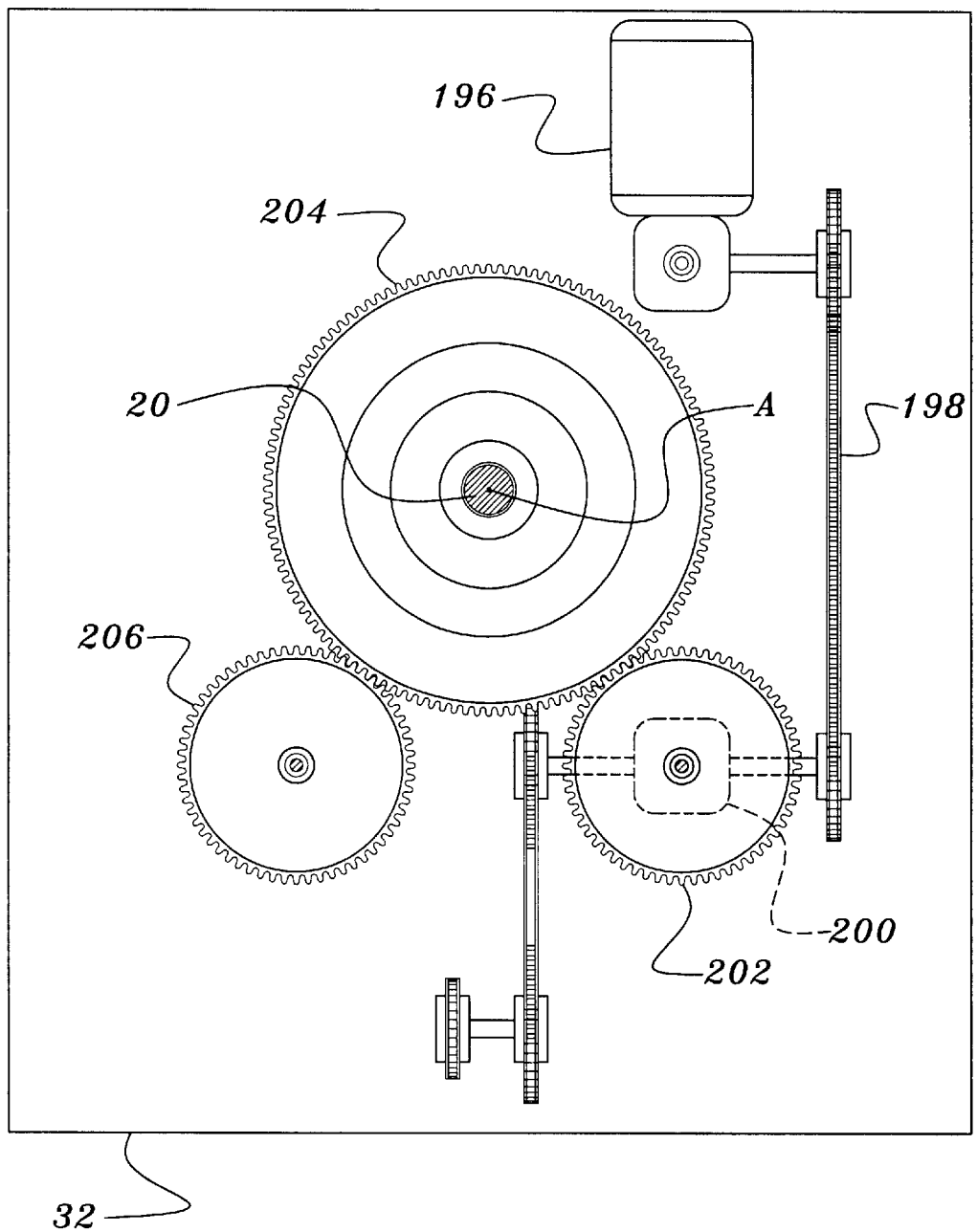
FIG. 5 is a cross-sectional plan view taken along line 5—5 of FIG. 1.

FIG. 5 discloses the means for rotating the central column of the Rotory orienter 10. This apparatus is mounted to the support frame 32 below the surface 33 and comprises a motor 196, a drive belt 198, a gear box 200 and three gears 202, 204 and 206. The gear 204 rotates the central column 20, the gear 202 rotates the shaft attached to the exit star wheel 29 and the gear 206 rotates the shaft attached to the entrance star wheel 28. The belt drive also operates the feed screw 26. Those skilled in the art will be able to determine the pitch and size of the gears necessary to rotate the star wheels 28 at 29 in synchronization with the rotation of the central column 20 and the rotation of the feed screw 26.

Pressurized air may be provided separately by any well-known pneumatic system, or from a pneumatic system that is present in many production plants. The air supplied need only be sufficient to operate the air cylinders. Systems using sensors to control pneumatic cylinders are well-known in the art and those skilled in the art will be able to select appropriate sensor equipment for the described purpose.

Unless otherwise described, the components of the rotary orienter 10 are constructed from steel. Steel provides the necessary strength and durability for long-term usage.

Having thus set forth a preferred construction for the current invention, it is to be remembered that this construction is but a preferred embodiment. Attention is now invited to a description of the use of the rotary orienter 10. The rotary orienter 10 is used as an element of a production line, for example production lines that fill and/or cap containers, label articles or containers and/or inspect articles or containers. For the purposes of illustration, containers that are to be labeled will be used as an example for discussion of the use of the invention. The rotary orienter 10 illustrated in the drawings is particularly suited for orienting four sided containers having a generally square cross-section. Articles with fewer sides may be oriented in the illustrated device; however, articles with a greater number of sides than four will require additional sensors and actuators. The rotary orienter 10 orients articles through a series of steps with each step comprising an examination of the article by a sensor to determine the orientation of the article and rotation of the article if it is improperly oriented. The rotary orienter 10 usually must have the capability of processing a number of steps that is equal to the number of sides minus one.

The rotary orienter 10 is placed in a production line and is connected to the other equipment by a pair of linear conveyor belts 22a and 22b. Containers are fed to the conveyor belt 22a and are captured between the guide 24 and the feed screw 26. As can be seen in the drawing FIG. 2, the container handles 14 are oriented to a maximum of four different directions. The screw feeder 26 ensures that the containers are fed to the rotary orienter 10 sufficiently spaced apart so that they may be readily handled by the entrance star wheel 28. The entrance star wheel 28 places the containers 12 centered upon an empty turntable 42 as the turntable 42 is rotated about the central column 20 in the clockwise direction. For this example, the objective is to have all container handles 14 oriented at the nine o'clock position in relation to a clock face, as a seen on the exit conveyor 22b that is adjacent to the exit star wheel 29. As soon as the containers 12 are centered upon the turntable 42 the platen 118 is lowered until it engages and rests upon the top of the container 12.

When the turntable 42 is empty, the platen is in the first, or highest, position to provide clearance for placement of the next container on the turntable 42. The cam 132 is therefore at its maximum height. The height of the cam 132 decreases as the station advances around the column 20 so that the cam follower 126 moves lower permitting the frame 121 to pivot downwardly lowering the spool 117 and thus lowering the shaft 112 and the platen 118 attached thereto. The cam 132 will be reduced in height until such time that the cam follower 126 no longer engages the cam 132 and the platen 118 freely rests upon the top of the container 12. The spring 138 biases the shaft to move downwardly to ensure firm contact of the platen 118 with the container 12.

Figure 14:
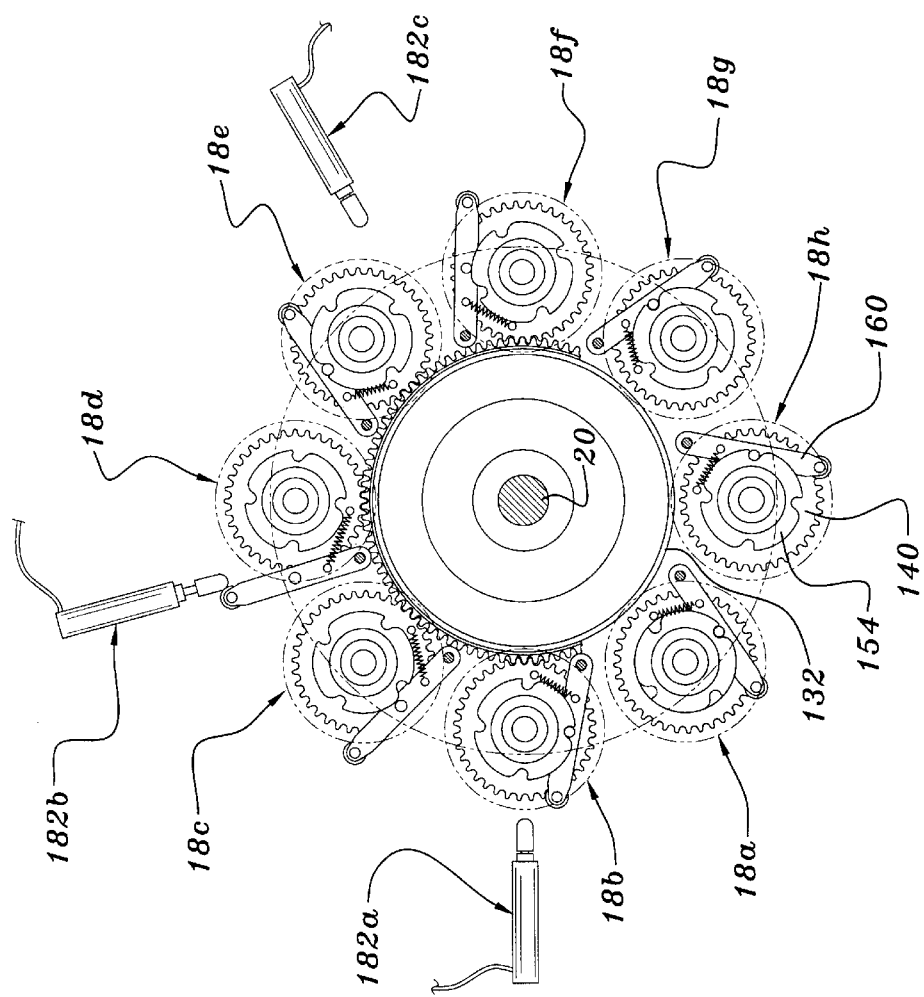
FIG. 14 is a cross-sectional plan view taken along line 14—14 of FIG. 1.

For ease of understanding, as seen in FIG. 3 and FIG. 14 each station 18 is labeled a–h, each container placed on a station is labeled 12a–g, and each handle is identified as 14a–g. At the station 18a as the container 14a passes the sensor 104a the sensor would see the handle 14a in the wrong position and will signal the lower actuator 96a and the upper actuator 182a to extend their pistons, 100 and 186 respectively, as station 18a approaches the lower and upper actuators. Container 12a will be in the incorrect position each time it is scanned by the sensors 104a–c and the container will be rotated 270 degrees to put its handle 14a in the proper orientation.

In another example, it can be seen that the container 12c was determined to be in the wrong orientation by sensor 104a and it is in the process of being rotated in a clockwise direction. In this case, the container 19c will now be in the correct position and sensors 104b and 104c will not signal the lower actuators 96b and 96c respectively or the upper actuators 182b and 182c respectively.

In an another example, lower actuator 96b has extended and engaged the lower arm 74 and the upper actuator 182b has extended and engaged the upper arm 160 of station 18d and the turntable and platen of station 18d are commencing to rotate in the clockwise direction. Once the rotation is complete the container will be properly oriented, and sensor 104c will not signal the lower actuator 96c or the upper actuator 182c.

Figure 8:
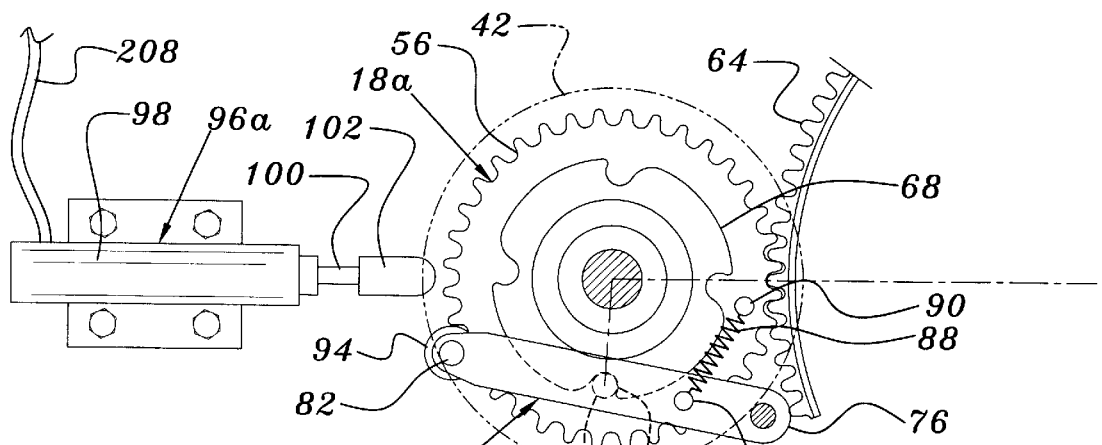
FIG. 8 is a detailed plan view of the lower indexing assembly of the invention of FIG. 1.

FIGS. 8–13 illustrate the steps taken by the lower indexing assembly once a signal is sent by sensor 104a to a relay (not shown) opening the pneumatic line 208 to its partnered lower actuator 96a. In FIG. 8 the piston 100 of lower actuator 96a has extended. The projection 86 of the lower arm 74 is engaging one of the detents 72 locking platform 42 and preventing it from rotating even though the teeth of lower gear 56 are engaging the teeth of the lower flexi-rack 64.

Figure 9:
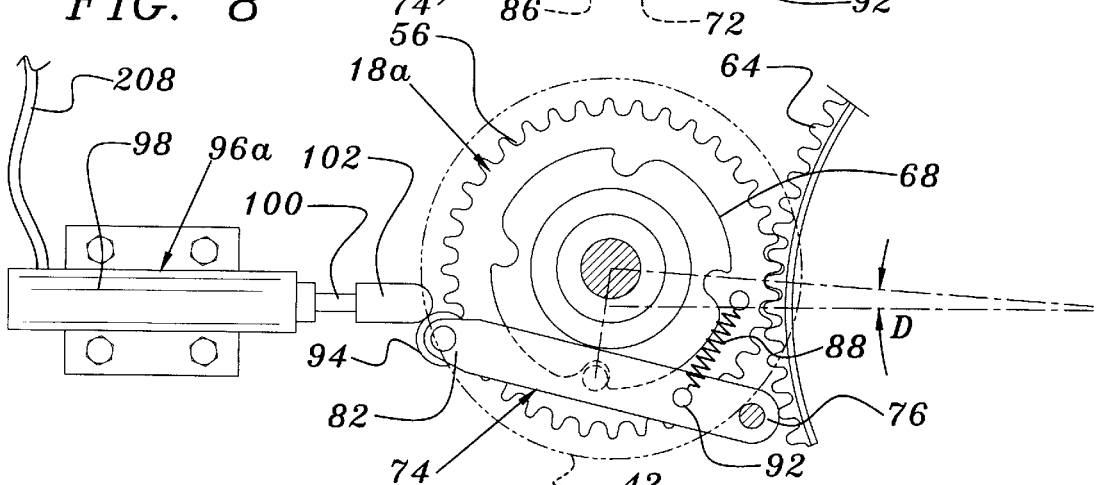
FIG. 9 is a detailed plan view of the lower indexing assembly of FIG. 8, illustrating rotation of the rotary orienter turret and engagement of the lower arm with the lower actuator.

In FIG. 9 the station 18 has advanced by the angle D about the axis A of the central column 20. The first end 102 of the piston 100 has engaged the wheel 94 that is attached to the first end 76 of the lower arm 74. However, the lower indexing wheel 68 is still locked and the lower slip clutch 54 permits the lower gear 56 to continue rotating.

Figure 10:
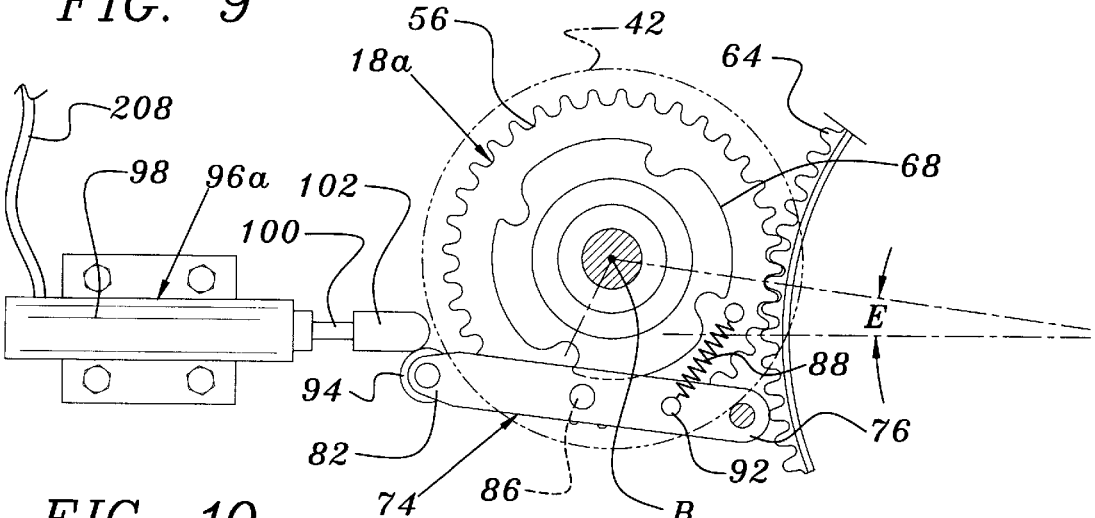
FIG. 10 is a detailed plan view of the lower indexing assembly of FIG. 9, illustrating further rotation of the rotary orienter turret and disengagement of the lower arm from the lower indexing wheel.

In FIG. 10, the station 18 has now advanced through the angle E. The first end 102 of the piston 100 remains in contact with the first end 76 of the lower arm 74. The lower arm now has pivoted against the spring 88 releasing the lower indexing wheel 68 for rotation of the turntable 42 about the axis B.

Figure 11:
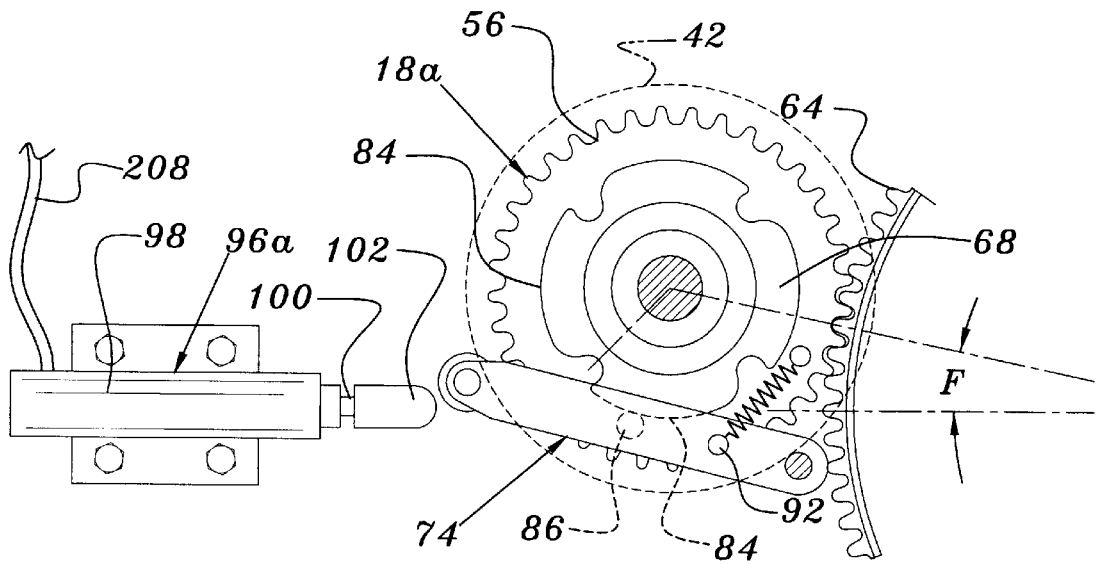
FIG. 11 is a detailed plan view of the mower indexing assembly of FIG. 10, illustrating further rotation of the rotary orienter turret and retraction of the lower actuator.

In FIG. 11 the station 18 has advanced through the angle F. The relay has automatically closed after a brief period of time and the air has been released so that the piston 100 has retracted releasing the lower arm 74. The lower arm 74 is biased inwardly by the spring 88, so that the projection 86 rests against the peripheral edge 84 of the lower indexing wheel 68.

Figure 12:
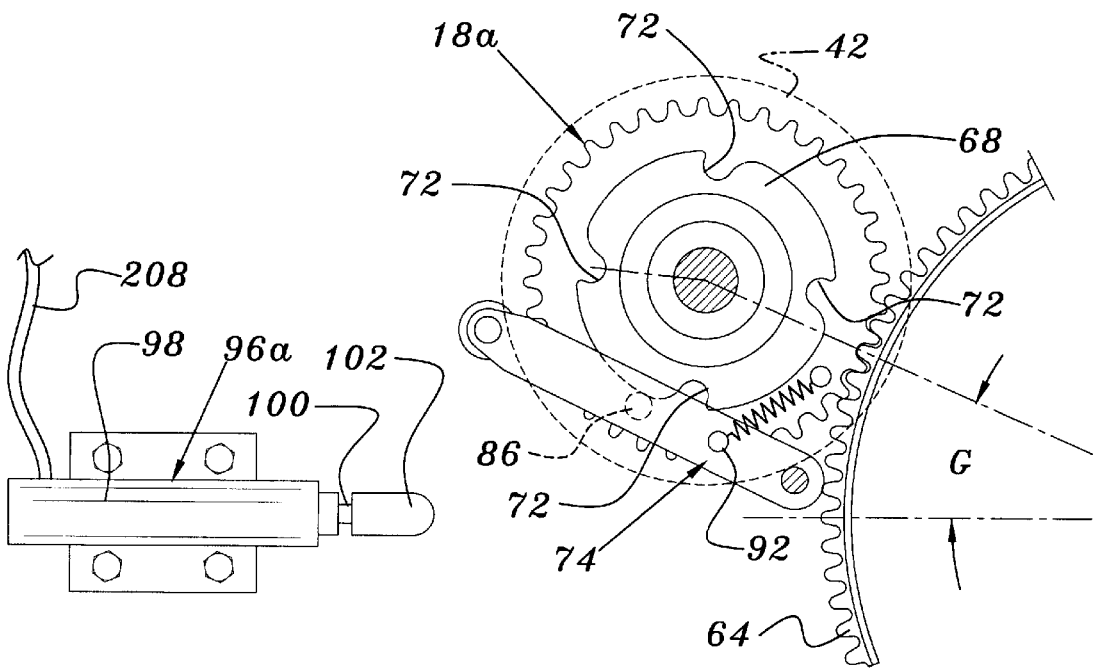
FIG. 12 is a detailed plan view of the lower indexing assembly of FIG. 11, illustrating further rotation of the rotary orienter turret and engagement of the lower arm with the lower indexing wheel.

In FIG. 12, the station 18 has moved through angle G. The lower indexing wheel continues to rotate in the clockwise direction with the next indent 72 approaching the projection 86.

Figure 13:
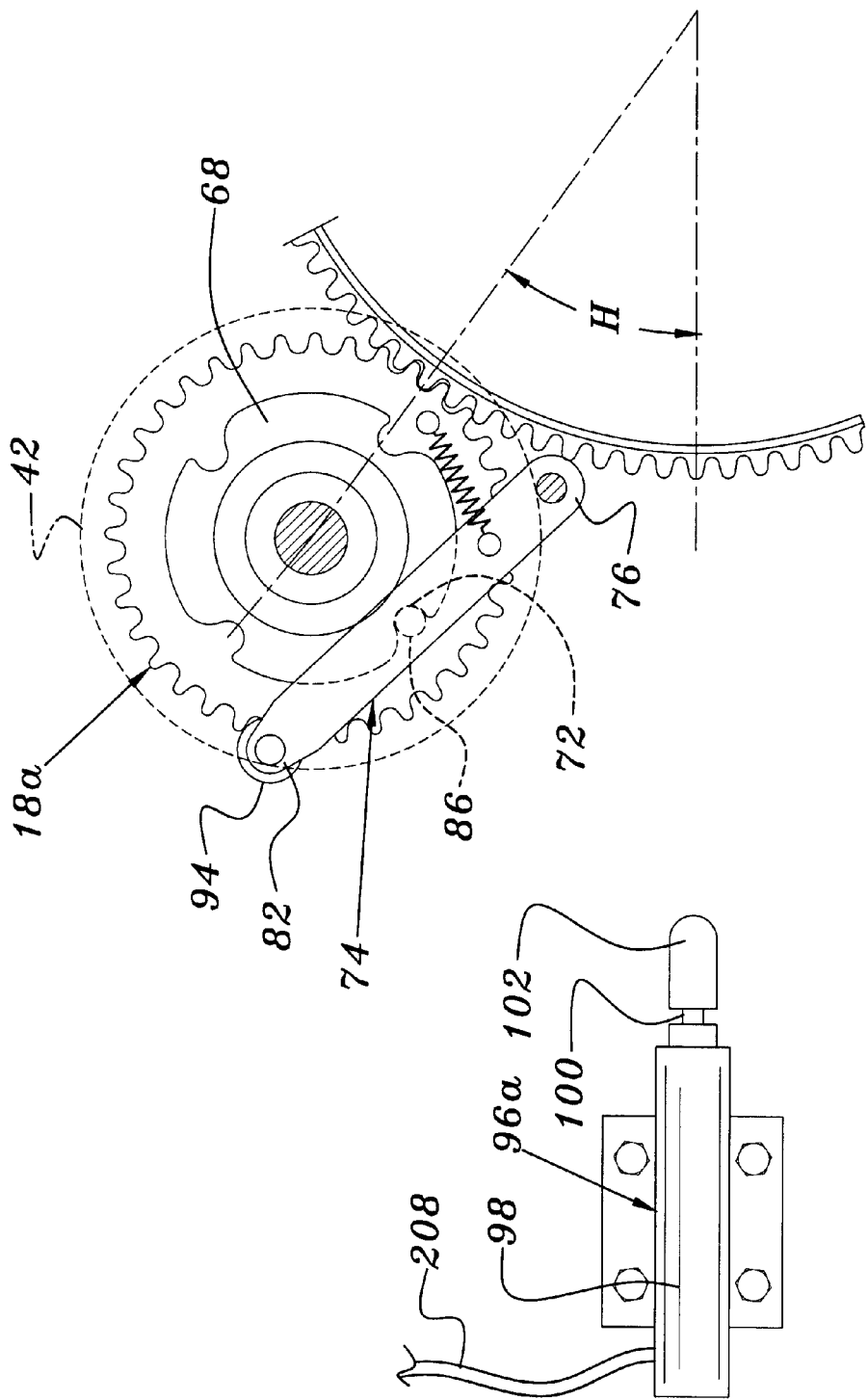
FIG. 13 is a detailed plan view of the lower indexing assembly of FIG. 12, illustrating further rotation of the rotary orienter turret and re-engagement of the lower arm with a detent of the lower indexing wheel.

In FIG. 13, the station 18 has now rotated through angle H. The projection 86 has engaged the next detent 72 locking the lower indexing wheel 68 to prevent it from rotating, which also prevents the turntable 42 from rotating. The turntable 42, and the container residing thereon, have rotated through 90 degrees. If the container is oriented correctly, the next sensor 104b will not signal the corresponding relay to extend the piston of the next lower actuator 96b. It the container is incorrectly oriented, the next sensor 104b will signal the corresponding relay to extend the piston 100 of the next lower actuator 96b for engagement with the lower arm of station 18a for rotation of turntable 42, along with the container residing thereon, through an additional 90 degrees.

FIGS. 15–17 illustrate the steps taken by the upper indexing assembly once a signal is sent by sensor 104*a* to a relay (not shown) opening the pneumatic line 210 to its partnered upper actuator 182*a*. As the upper indexing system operates simultaneously with the lower indexing system, the upper actuator 182*a* will operates simultaneously with the lower actuator 96*a* As the upper indexing system operates in the same manner as the lower indexing system, for illustration only three of the figures will be shown, FIG. 15 being comparable with FIG. 8, FIG. 16 being comparable with FIG. 11 and FIG. 17 being comparable with FIG. 13.

In FIG. 15 the piston 186 of the upper actuator 182*a* has extended. The projection 172 of the upper arm 160 is engaging one of the detents 158 locking the platen 118 and preventing it from rotating even though the teeth of upper gear 140 are engaging the teeth of the upper flexi-rack 142.

In FIG. 16 the station 18 has advanced through the angle F'. The relay has automatically closed after a brief period of time and the air has been released so that the piston 186 has retracted releasing the upper arm 160. The upper arm 160 is biased inwardly by the spring 174, so that the projection 172 rests against the peripheral edge 170 of the upper indexing wheel 154.

In FIG. 17, the station 18 has now rotated through angle H'. The projection 172 has engaged the next detent 158 locking the upper indexing wheel 154 to prevent it from rotating, which also prevents the platen 118 from rotating. If the container is oriented correctly, the next sensor 104*b* will not signal the corresponding relay to extend the piston of the next upper actuator 182*b*. It the container is incorrectly oriented, the next sensor 182*b* will signal the corresponding relay t6 extend the piston 186 of the next upper actuator 182*b* for engagement with the upper arm of station 18*a* for rotation of platen 118, through an additional 90 degrees.

As shown in FIG. 2, containers 12 are continuously removed from the rotary orienter 10 by the exit star, wheel 29, and are placed on the exit linear conveyor 22*b*. The containers are then transported to the next apparatus for work to be done thereon.

While the foregoing describes a particularly preferred embodiment of the present invention, it is to be understood that numerous variations and modifications of this structure will readily occur to those skilled in the art. Accordingly, the foregoing description is to be considered illustrative only of the principles of this invention and is not to be considered limitative thereof, the scope of the invention being determined solely by the claims appended hereto.

What is claimed is:

1. A rotary orienter for moving articles into a predetermined orientation comprising:
   a support frame;
   a central column having a longitudinal axis, said column being mounted to said support frame for rotation of said column about said longitudinal axis of said column;
   means for rotating said central column;
   at least one station connected to said column for rotation with said column, said station comprising;
      a spindle having a longitudinal axis, said spindle being rotatably connected to said column for rotation about said longitudinal axis of said spindle, said spindle having a first end and a second end;
      a turntable being attached to said first end of said spindle;
      means for rotating said spindle being connected to said support frame and being connected to said spindle;
      a lower slip clutch mounted on said spindle and connected to said means for rotating said spindle;
      a lower indexing wheel mounted on said spindle, said lower indexing wheel having at least two detents formed therein;
      a lower arm having a first end pivotally mounted to said support frame and a second end extending free, said arm being engageable with said detents of said indexing wheel such that when so engaged, said indexing wheel is prevented from rotating with said spindle;
      a lower actuator connected to said support frame, said lower actuator being selectively engageable with said lower arm such that said lower arm is disengaged from one of said detents of said lower indexing wheel when said lower actuator engages said lower arm, so that said turntable rotates until said arm is released by said lower actuator and said lower arm engages another one of said at least two detents;
      a shaft having a longitudinal axis, said shaft being rotatably connected to said column for rotation about said longitudinal axis of said shaft, said longitudinal axis of said shaft being generally coincident with said longitudinal axis of said spindle, said shaft having a first end and a second end;
      a platen attached to said first end of said shaft;
      means for moving said platen between a first position and a second position being attached proximal to said second end of said shaft;
      means for rotating said shaft being connected to said support frame and being connected to said shaft;
      an upper slip clutch being mounted on said shaft and being connected to said means for rotating said spindle;
      an upper indexing wheel mounted on said shaft, said upper indexing wheel having at least two detents formed therein;
      an upper arm having a first end pivotally mounted to said support frame and a second end extending free, said upper arm being engageable with said detents of said indexing wheel such that when so engaged, said upper indexing wheel is prevented from rotating with said shaft; and
      an upper actuator connected to said support frame, said upper actuator being selectively engageable with said upper arm such that said upper arm is disengaged from one of said detents of said upper indexing wheel when said upper actuator engages said upper arm, so that said platen rotates until said upper arm is released by said upper actuator and said upper arm engages the other one of said detents;
   means for moving articles onto said turntable; and
   at least one sensor mounted to said support frame for determining the orientation of an article on said turntable, said sensor simultaneously activating said lower and upper actuators for synchronized rotation of said turntable and said platen when the orientation of an article is not in accordance with a predetermined orientation.

2. A rotary orienter as in claim 1 wherein said means for rotating said spindle further comprises;
   a lower gear mounted on said spindle proximal said second end of said spindle;
   a first set of gear teeth connected to said support frame for engagement with and rotation of said lower gear as said spindle rotates about said column, whereby said spindle is rotated about said longitudinal axis of said spindle.

3. A rotary orienter as in claim 1 wherein said means for rotating said shaft further comprises;
   an upper gear mounted on said shaft proximal said second end of said shaft;
   a second set of gear teeth connected to said support frame for engagement with and rotation of said upper gear as said shaft rotates about said column, whereby said shaft is rotated about said longitudinal axis of said shaft.

4. A rotary orienter as in claim 1 wherein said lower actuator further comprises;
   a first pneumatic cylinder having a piston shaft extending outwardly therefrom, said first cylinder being attached to said support frame, such that when said first cylinder is activated said piston shaft of said first cylinder engages said lower arm releasing said lower arm from said detent in said lower indexing wheel as said central column rotates.

5. A rotary orienter as in claim 1 wherein said upper actuator further comprises;
   a second pneumatic cylinder having a piston shaft extending outwardly therefrom, said second cylinder being attached to said support frame, such that when said second cylinder is activated said piston shaft of said second cylinder engages said upper arm releasing said upper arm from said detent in said upper indexing wheel as said central column rotates.

6. A rotary orienter as in claim 5, wherein said means for moving said platen between a first position and a second position comprises;
   a biasing means connected to said shaft and platen such that said platen is urged toward said second position;
   a lever having a first end pivotally attached to said support frame, a second end having a cam follower mounted thereon and said lever being pivotally attached to said shaft intermediate said first and second ends of said lever; and
   a cam connected to said support frame so that when said cam follower engages said cam, said platen is selectively moved against said biasing means toward said first position as said shaft rotates about said column.

\* \* \* \* \*